Sept. 22, 1959

J. K. JACKSON 2,905,081

FLEXOGRAPH PRINTING MACHINE

Filed Sept. 30, 1955

INVENTOR.
JOHN K. JACKSON

BY

*Howard E. Thompson*

ATTORNEY

Sept. 22, 1959 J. K. JACKSON 2,905,081
FLEXOGRAPH PRINTING MACHINE
Filed Sept. 30, 1955 6 Sheets-Sheet 2

INVENTOR.
JOHN K. JACKSON
BY
*Howard E. Thompson*
ATTORNEY.

Sept. 22, 1959  J. K. JACKSON  2,905,081
FLEXOGRAPH PRINTING MACHINE
Filed Sept. 30, 1955  6 Sheets-Sheet 3

INVENTOR.
JOHN K. JACKSON
BY
Howard T. Thompson
ATTORNEY.

2,905,081
FLEXOGRAPH PRINTING MACHINE

John K. Jackson, Westfield, N.J.

Application September 30, 1955, Serial No. 537,671

9 Claims. (Cl. 101—35)

This invention relates to machines for printing various types and kinds of articles or members, wherein the articles are picked up by an endless conveyer at a delivery station and, then, fed through one or more printing stations for one or more color printings or impressions upon the article and, then, over an ejector station to a discharge station. More particularly, the invention deals with a machine of the character described, wherein the article is yieldably supported upon the endless conveyor, so as to yield in passage through the printing station to insure perfect impressions upon the article.

Still more particularly, the invention deals with a machine having means for controlling pick-up of articles, one at a time, at the delivery station and for positioning of the articles on supports constituting part of the endless conveyor in such manner as to minimize surface friction upon the article in delivery to the support of said conveyor.

The novel features of the invention will be best understood from the following description, when taken together with the accompanying drawing, in which certain embodiments of the invention are disclosed and, in which, the separate parts are designated by suitable reference characters in each of the views and, in which:

Fig. 7a is an enlarged partial sectional detail view of the part of the construction shown in Fig. 7.

In illustrating one adaptation and use of my invention, I have shown the machine as applied to the printing of disc-like articles, such, for example, as phonograph records which are composed of suitable plastic materials and, in which, appropriate types of quick drying inks will be employed, that is to say, inks employing volatile ink solvents impressions of the flexograph or aniline-type.

Figure 1:
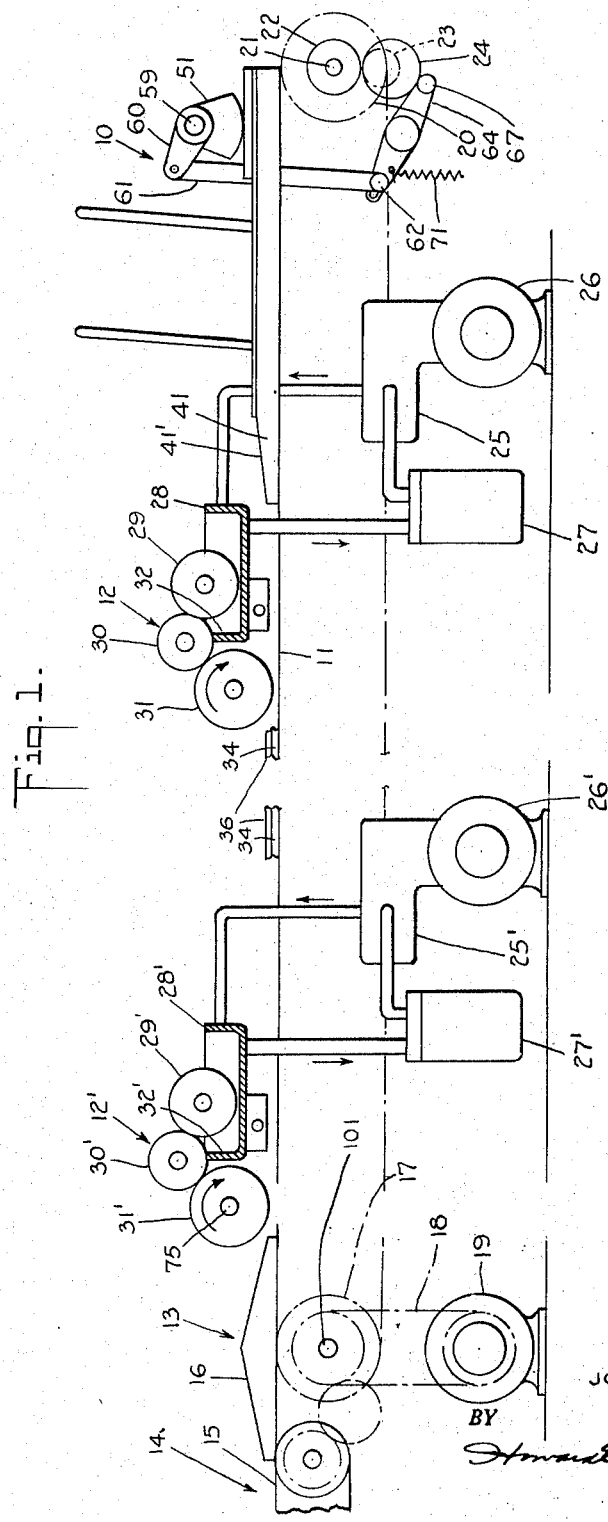
Fig. 1 is a diagrammatic side view, schematically showing parts of a machine made according to my invention, with parts broken away.

In Fig. 1 of the drawing, I have diagrammatically illustrated the general machine and, in said figure, 10 represents the delivery station, where articles to be printed are delivered for pick-up by an endless conveyor in the form of a chain 11 for passing the articles through a number of printing stations, a first of these stations being shown at 12 and the last of such stations at 12', it being understood that one or more additional stations may be positioned between 12 and 12', depending upon the number of colors to be printed. For general usage, three of such stations would suffice for most uses. At 13 is indicated the article ejector station for removing articles from the conveyor and transmitting them to a discharge station 14, the latter being in the form of a conveyor belt 15 positioned at the discharge end of the ejector 16 at the ejector station 13.

As diagrammatically seen in Fig. 1 of the drawing, the chain 11 passes over a drive sprocket 17 driven through a belt or chain 18 from a motor 19 and also over another sprocket 20, on the shaft 21 of which is a gear 22 driving a gear 23 on a shaft on which is fixed a cam 24.

As each unit 12, 12' is of the same construction, the brief description of one unit will be applicable to both, the reference numerals being primed on the respective units. These units comprise an ink pump 25, 25' driven by a motor 26, 26' to circulate ink from an ink reservoir 27, 27' through suitable piping, as diagrammatically shown for delivery to an ink fountain 28, 28', in which is partially submerged an ink feed roller 29, 29' for transmitting ink to a transfer roller 30, 30' to ink the type of a printing cylinder 31, 31'. It will be noted that the end wall 32, 32' of the fountain 28, 28' is disposed centrally below the axis of the roller 30, 30'. The cylinder 31, 31' and associate supports therefor are shown in enlarged detail in Fig. 7 of the drawing, in which figure, the cylinder 31 is disclosed.

Figure 2:
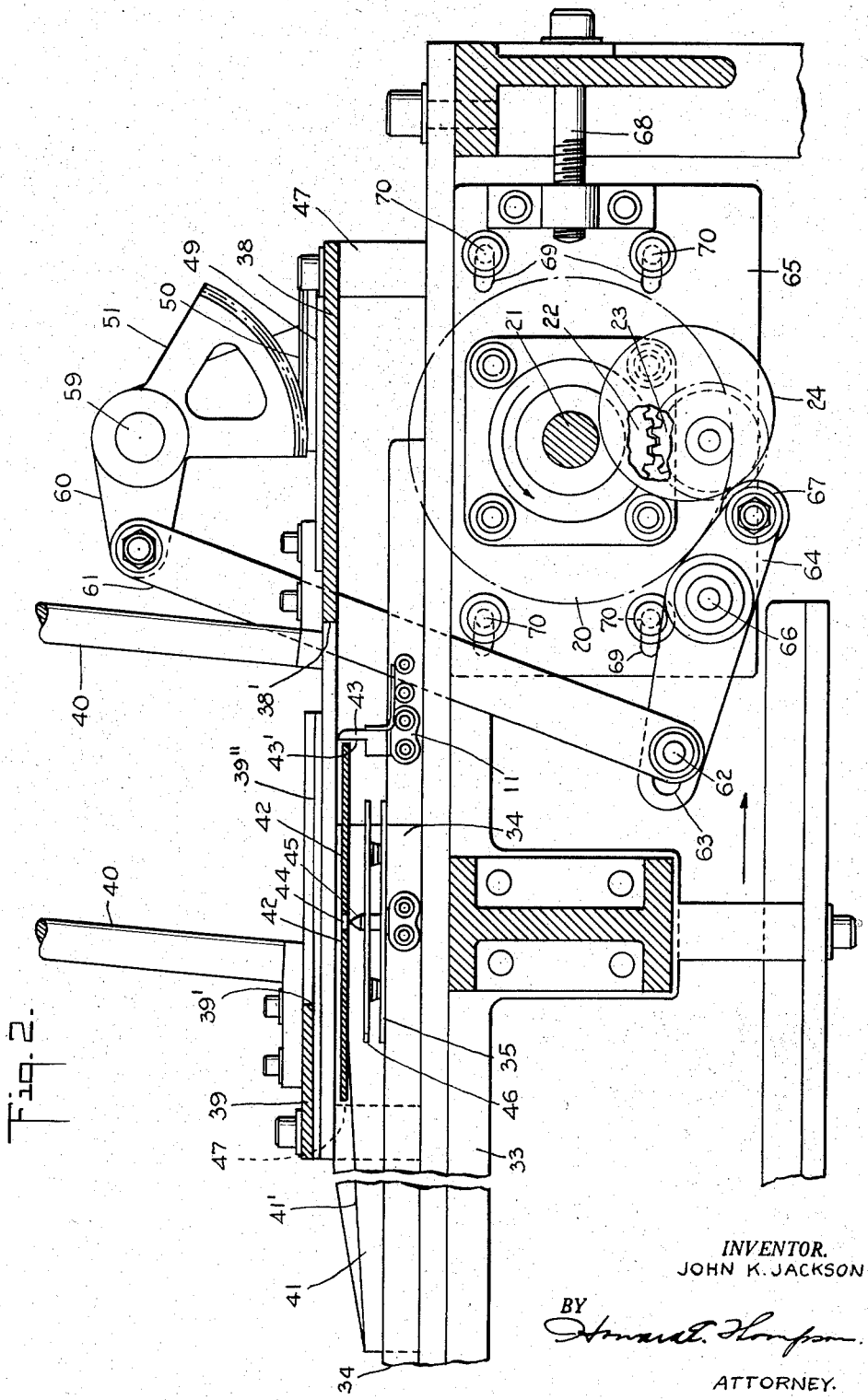
Fig. 2 is an enlarged sectional detailed view of the righthand end portion of the machine, as diagrammatically shown in Fig. 1, with part of the construction broken away and in section, diagrammatically showing only part of the conveyor chain and omitting details of the article support.
Figure 3:
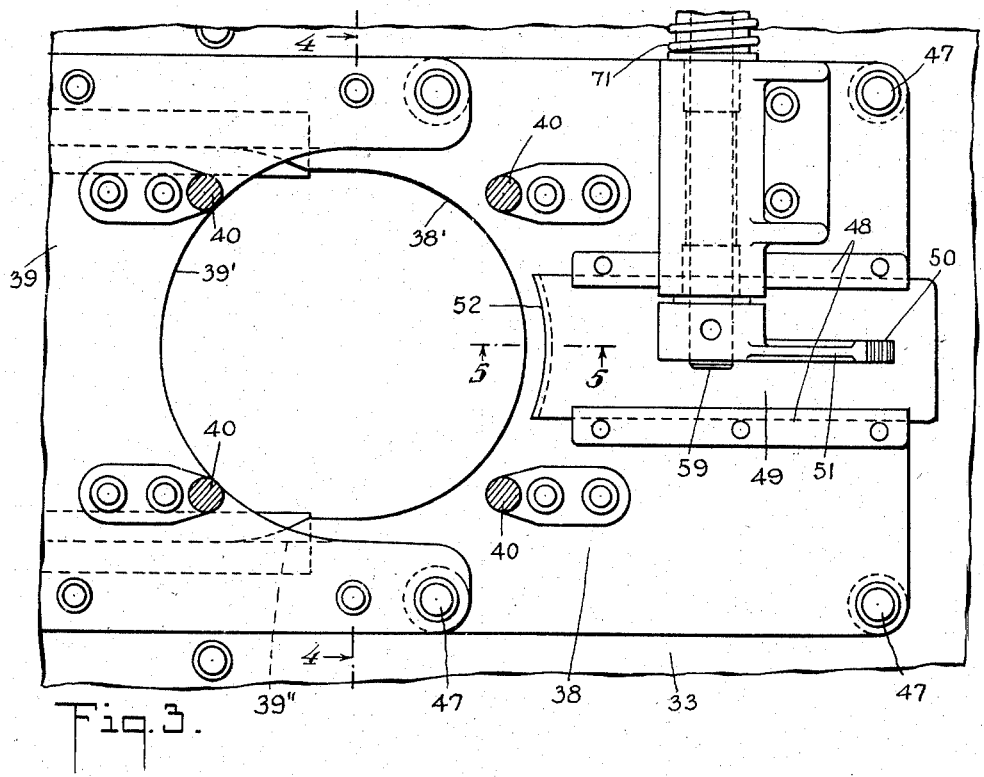
Fig. 3 is a sectional plan view of part of the construction shown in Fig. 2, omitting the chain conveyor and the article support.
Figure 4:
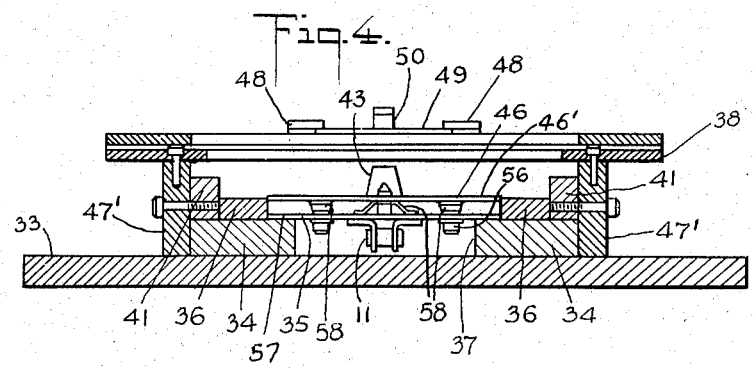
Fig. 4 is a section on the line 4—4 of Fig. 3, omitting parts of the background showing and illustrating the chain and the article support in position, preparatory for delivery of an article, the article being omitted from the showing.
Figure 6:
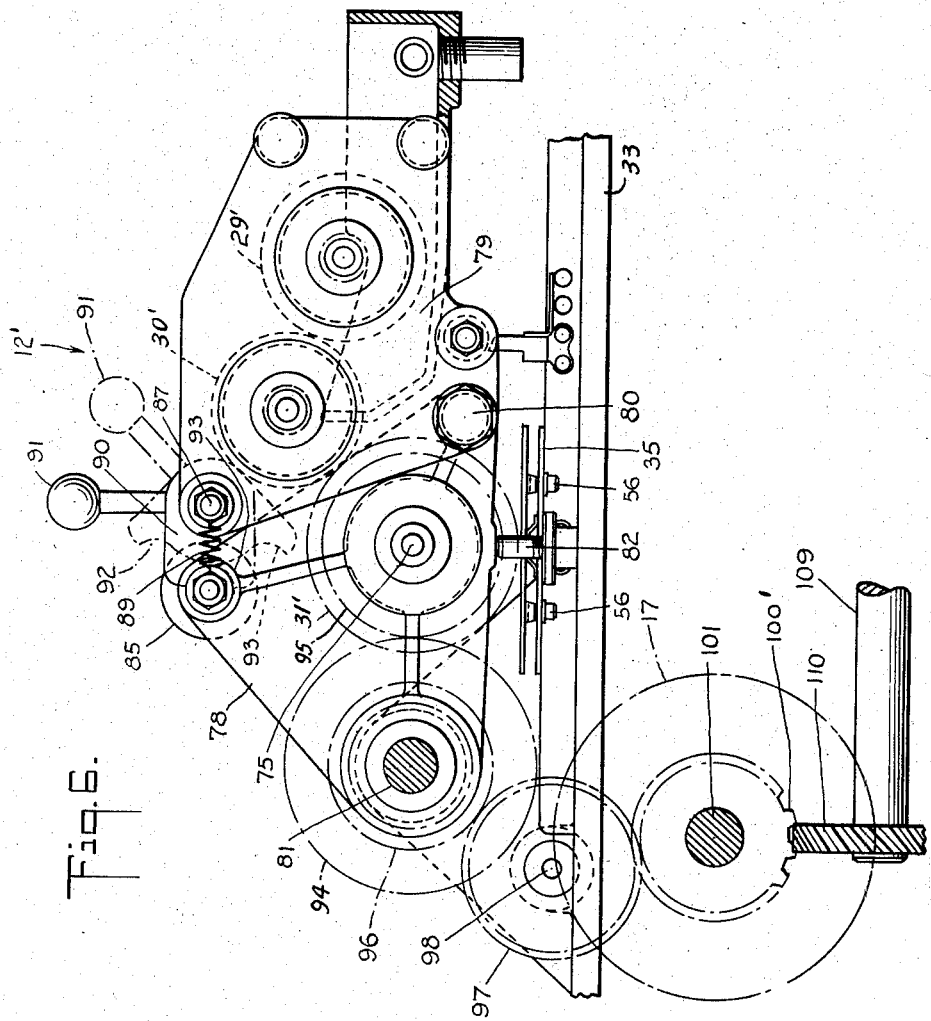
Fig. 6 is an enlarged side view of one of the printing stations, with parts of the construction broken away and in section.

The machine includes a top plate 33, shown, in part, in Figs. 2, 3 and 6, upon which is supported a pair of rails 34, note Fig. 4, which form direct supports for article supporting members 35. These members are further guided for positioning in their passage beneath the respective printing stations by guide rails 36. It will appear, from a consideration of Fig. 4 of the drawing, that the chain 11, as well as the members 35, operate in a space 37 between the rails 34. The members 35 are directly coupled with links of the chain 11, as indicated in part in Fig. 2 and also shown in Fig. 4.

At the delivery station are arranged two upper plates 38 and 39, having recesses therein, partially defining semi-circular openings 38', 39' which are opposed to each other to collectively form the more or less elliptical opening, noted in Fig. 3 of the drawing, through which records pass in delivery from the reclining guide rods 40, four of which are employed, note Fig. 3, onto rails 41 and then to the supporting members 35, as will appear from a consideration of Fig. 2 of the drawing. The rods 40 are supported upon the top plates 38 and 39, as will clearly appear from a consideration of Figs. 2 and 3 of the drawing. It will be noted from a consideration of Fig. 2 of the drawing that gauges 39" are disposed at the sides of the plate 39 and between the plate 39 and the plate 38. These gauges are slightly larger than the maximum thickness of the article, or record, being delivered and facilitates the one delivery only of the article or record and positioning of the same above the members 35, as noted in Fig. 2 of the drawing.

It will be apparent that the rails 34 support the members 35 throughout the full length of their movement between the sprockets which drive the chain 11.

It will be noted, from a consideration of Fig. 2 of the drawing, that other short rails 41 are employed at and adjacent the delivery station, these rails being disposed outwardly of the rails 36 in Fig. 4 of the drawing and upper surfaces 41' of these rails are bevelled in the feed direction of the press so that, when a workpiece or article to be printed, such, for example, as the record 42, noted in Fig. 2 of the drawing, is delivered through the opening, it will land upon the upper surfaces 41' of the rails 41 and then, as the record is advanced by the dog 43 fixed to the chain 11, the record will be gradually lowered so that the aperture 44 of the record will drop onto the alinement pin 45 of the supporting member 35, as the chain 11 progressively feeds in the direction of the printing station 12.

In this last operation, the relative position of the pin 45 with respect to the surface 43' of the dog 43 is such that the record 42, in passing downwardly over the conical end of the pin 45, will be advanced in the feed direction to a slight extent in order to free the edge of the record 42 from the surface 43', thus leaving the record solely supported upon the member 35 or the top yieldable impression plate 46 thereof.

At this time, it will be understood that a series of the members 35 and dogs 43 are fixed along the chain 11 so that, as the endless chain is operated, records will be picked-up at the delivery station and progressively printed at the various printing stations and, then, discharged at the ejector station, the cylinders 31 of the printing stations being operated in synchronism with the drive of the chain so that printing is performed upon the records 42 without any variance or differential in speeds of travel, thus avoiding any possibility of blurring in the impressions made upon the record.

The plates 38 and 39 are supported upon raised columns 47, noted, in part, in Figs. 2 and 3 of the drawing Considering Fig. 4 of the drawing, it will appear that upstanding wall portions 47' support rails 41, as well as the plate 38.

Figure 5:
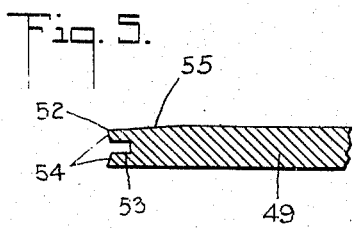
Fig. 5 is an enlarged sectional detail view on the line 5—5 of Fig. 3, showing only the article delivery or feed plate.

Arranged upon the plate 38 are a pair of guide rods 48, in which a workpiece or record feed plate 49 is slidably mounted. The plate 49 has, centrally of the upper surface and at one end portion thereof, a rack 50, with which a segment 51 operates in moving the plate 49 forwardly and backwardly in delivering records one at a time from the bottom end of the stack at the delivery station, the records being supported on the plate 38 and then fed for free passage down through the opening defined by the recesses 38', 39'. The forward delivery end of the plate 49 is curved, as seen at 52, and this delivery end preferably has, centrally thereof, a recess 53 defining what may be termed a channel, the purpose of which is to receive any flare or rough edging that may prevail on the periphery of the record. Outer edges of opposed walls of the channel are bevelled, as seen at 54, note Fig. 5 of the drawing. These bevelled edges control engagement with the edge of the record and, by providing a bevelled upper surface 55 on the delivery end portion of the plate 49, engagement of the plate 49 with the next record to be delivered is eliminated. In other words, the end 52 is of less thickness than the remainder of the plate 49, thus engagement with the edge of the record being delivered is at a point below the upper surface of the delivered record.

It will be apparent, from a consideration of Figs. 4 and 6 of the drawing, that the upper surface 46' of the impression plate 46 is disposed above the upper surface of the rails 36, so that the record is not in engagement with any surface as it is fed through the machine from one printing station to the other, thus eliminating any marring of the record or other article that might be supported upon the member 35. As previously stated, the plate 46 is yieldable and this yielding support is provided by incorporating, on the lower surface of the plate 46, a series of preferably four downwardly extending studs 56, which are guided in the lower plate 57 of the member 35 and mounted on the studs 56 are yoke-shaped springs 58 which are positioned between the plates 46 and 57 and facilitate slight yielding movement of the plate 46 in the direction of the plate 57. As each of the members 35 are of the same construction, only one member is specifically described, but, as stated previously, a number of these members are spaced along the chain 11.

The gear segment 51 is mounted on a suitably supported shaft 59 arranged above the plate 38 and includes a lever 60, with which is pivotally coupled an operating link 61, the lower end of the link having an adjustable pivotal coupling, as at 62, in an elongated aperture 63 of a lever 64, pivotally supported on a frame plate 65, as seen at 66. The other end of the lever carries a roller 67 which operates upon the cam 24. Note Figs. 1 and 2 of the drawing.

It will appear from a consideration of Fig. 2 of the drawing that the plate 65 is adjustably supported in the frame of the machine through an adjustment screw 68, the plate 65 having four spaced elongated apertures 69, in which clamp bolts 70 operate in securing the plate 65 in any adjusted position, this adjustment being provided primarily for maintaining the chain in taut operating condition at all times.

A spring 71 is employed to support the roller 67 of the lever 64 in constant engagement with the cam 24 and this spring is shown in a diagrammatic manner in Fig. 1 of the drawing and shown, in part, in a true position in Fig. 3 of the drawing, where the spring is mounted on the shaft 59; thus the spring 71 operates to return the slide 49 from the extended operative position to the retracted position shown in Fig. 3; whereas, the cam 24 actuates the segment 51 in the forward or operative stroke of the feed plate 49.

Figure 7:
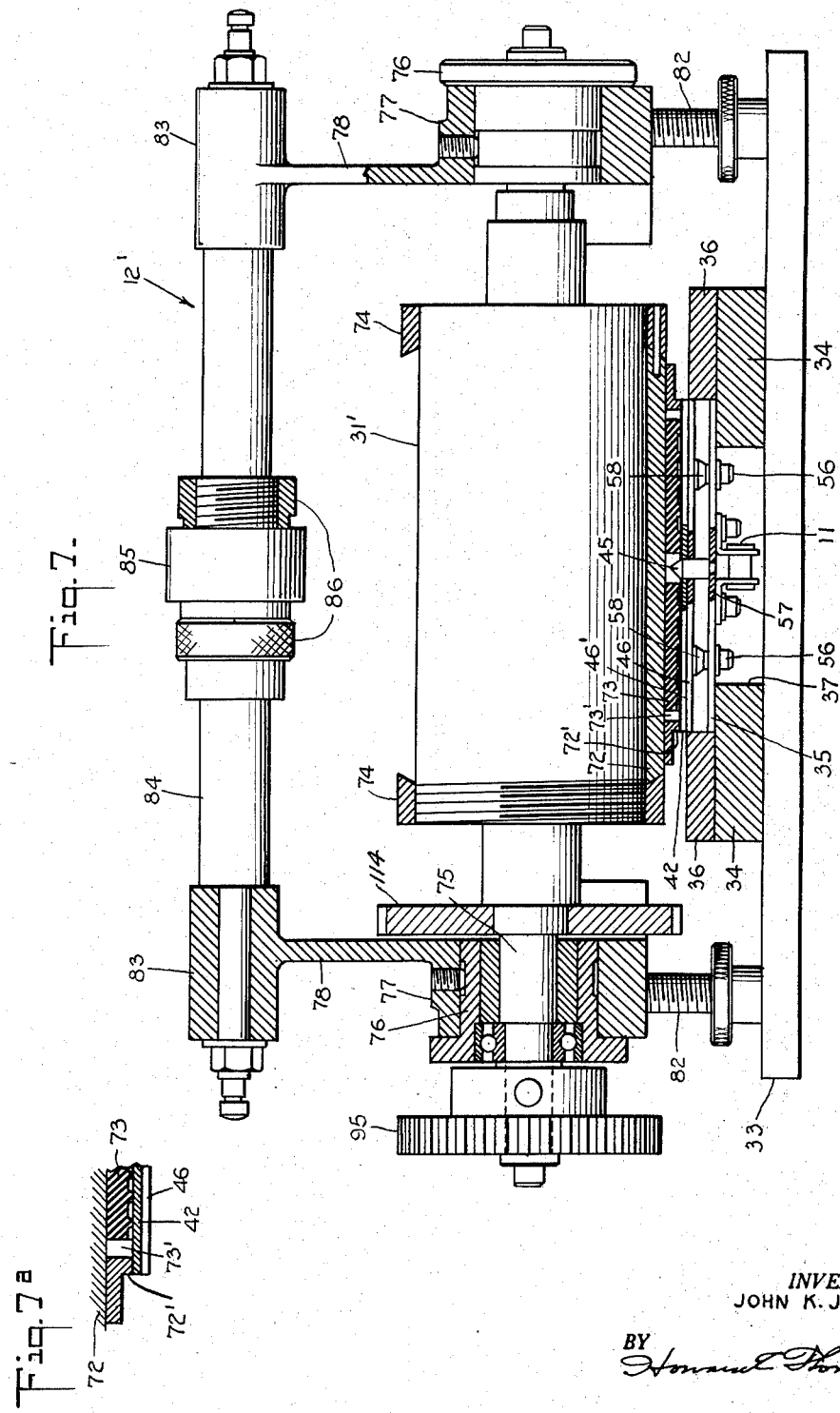
Fig. 7 is a diagrammatic cross-sectional view through one of the printing stations, parts of the construction being shown in elevation and parts omitted.

Considering Fig. 7 of the drawing, it will appear that, supported on the cylinder 31 is a plate saddle 72 having a pressure ring 72' on the outer surface thereof, the contour of which generally conforms to the contour of a rubber printing plate 73. The printing plate 73 is adhesively secured to the plate saddle 72 and the periphery of the printing plate 73 is slightly spaced from the ring 72', as seen at 73'. The saddle 72 is supported upon the cylinder by bevelled retaining rings 74, one of which is in threaded engagement with the cylinder 31 to clamp the saddle 72 in position on the cylinder. Means, later described, is provided for centralizing the cylinder, including the saddle and printing plate 73, for alinement with the pin 45.

The printing plate will be suitably characterized to provide the desired imprint on the record, as it passes beneath the rotating cylinder and the type or impression projects sufficiently on the printing plate to insure engagement with the surface of the record, taking into consideration slight variances which may prevail in thickness of the records and this being compensated for further by the yieldability of the impression plate 46.

The shaft 75 of the cylinder 31 has an eccentric mounting in sleeves 76 supported in suitable bearings 77 at sides of the machine. This eccentric mounting provides an adjustment in controlling positioning of the cylinder 31 with respect to the records or the supporting member 35 of the record. The bearings 77 constitute part of a main frame 78 and a supplemental frame 79, the latter being pivoted in the main frame, as at 80, note Fig. 6. The main frame 78 swings on a shaft 81, so that the entire printing unit can swing on the pivot shaft 81, thus the printing cylinder, or the plate 73 is moved by gravity into engagement with the record. This downward movement is checked, however, by adjustable stop screws 82, as noted clearly in Fig. 7 of the drawing, the screws limiting and controlling downward movement of the frame 78.

At the upper part of the main frame 78 are bearings 83 supporting a cam shaft 84, on which a cam 85 is adjustably clamped between a pair of clamp sleeves 86, note Fig. 7, so that the cam can be adjusted into position to control engagement of the inking roller 29, 29' with the printing plate supported on the cylinder 31, 31'. It is here pointed out that, while the reference numerals have been primed in Fig. 1 of the drawing, in designating the printing units of the printing stations, as the structure of each of the printing units are identical, the priming of the references has been dispensed with in view of the fact that the detail showing of one of the units in Figs. 6, 7 and 8 of the drawing happens to be the unit at the station 12'. This is done because this particular unit is in closer proximity to the direct drive.

Figure 8:
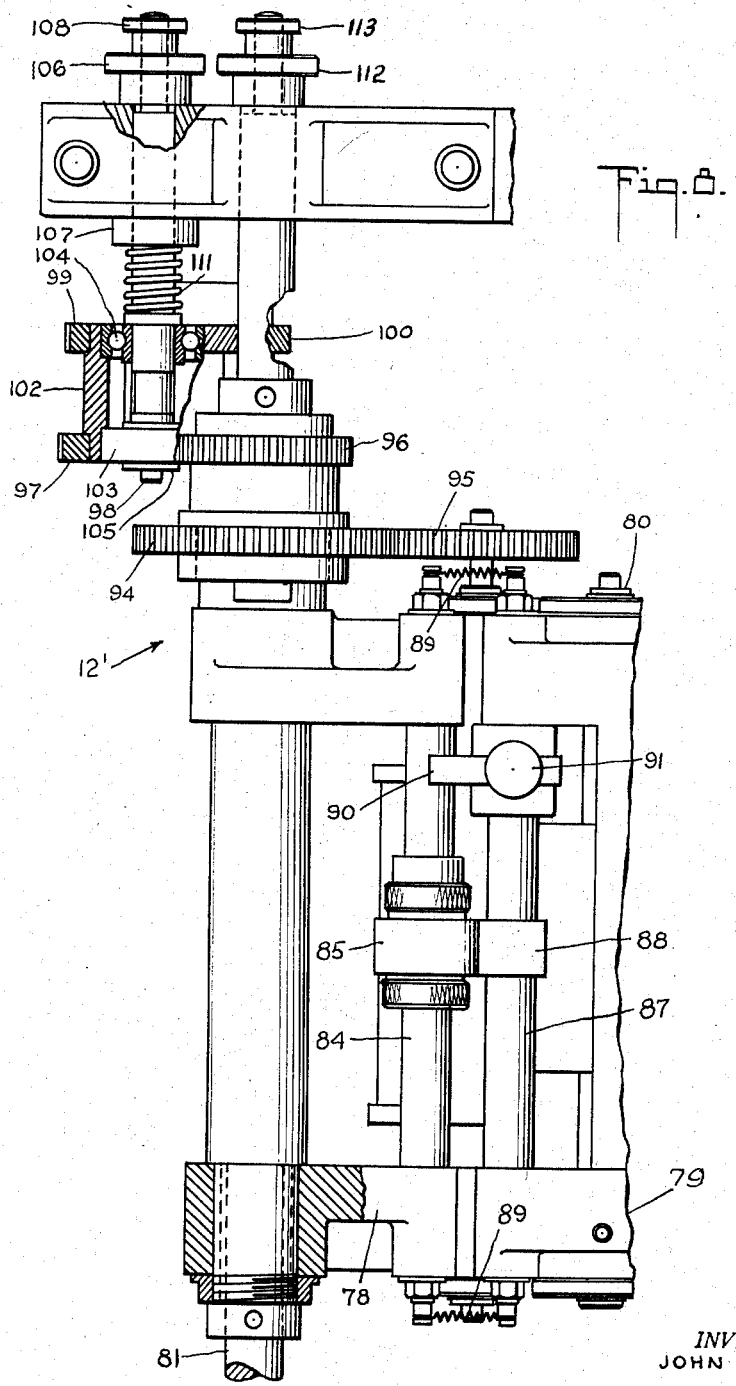
Fig. 8 is a partial plan view of the structure shown in Fig. 6, omitting parts of the construction.

Mounted in the upper portion of the supplemental frame 79 in suitable bearings is a transverse shaft 87, centrally of which is a roller 88, note Fig. 8, the roller bearing upon the cam 85 and being held in engagement with the cam by springs 89 suitably mounted at ends of the shafts 84 and 87, as clearly noted in Fig. 8 of the drawing. A throw-out dog 90 is mounted on the shaft 87 and operated by a lever 91, so as to move either the recess 92 or the recess 93 into engagement with the shaft 84 note Fig. 6. When the recess 92 of the dog engages the shaft, the transfer roller 30, 30' will be supported in position to ink the type of the printing plate 73, this operative position being shown in Fig. 6 of the drawing. However, in the dotted line position of Fig. 6, the groove 93 engages the shaft and supports the inking roller out of engagement with the type. The adjustment of the cam 85 facilitates proper positioning of the inking roller to control and regulate the desired imprint upon the record, as will be apparent.

Arranged upon the shaft 81, adjacent one side of the printing unit, is a gear 94 which meshes with a gear 95 on the cylinder shaft. Also on the shaft 81, outwardly of the gear 94, is another gear 96 which meshes with a gear 97 mounted on a stub shaft 98, the gear 97 including, at one side thereof, a helical gear 99 meshing with another helical gear 100 disposed upon the shaft 101 note Fig. 6, on which the sprocket 17 is mounted.

It will appear, from Fig. 8 of the drawing, that the gear assemblage, comprising the gear 97 and 99, includes a mounting sleeve 102, having bearings 103 and 104 at the ends thereof, the bearing 103 engaging a collar 105 on the shaft 98 so that, by adjustment of a sleeve nut 106, the gear 99 may be shifted with respect to the gear 100 so as to control longitudinal position of the printing plate with respect to the record on the member 35, in other words, to advance or retard the drive so as to insure synchronism of drive between the chain 11 and the cylinder 31. This adjustment is made possible through relative axial movement of the helical gears producing relative movement of the mechanism to the slight extent which is required in providing the desired synchronism. A spring 111 is mounted on the shaft and normally supports the gear unit against the collar 105, the spring engaging a suitable bearing 107 in the frame and at 108 is shown a lock nut for definitely fixing adjusted position of the gear 99. Another adjustment is provided, which adjustment comprises a sleeve nut 112 and a lock nut 113 is provided to shift the entire printing unit, including the cylinder 31, for alinement with the pins 45 or the articles supported on the members 35, as will be apparent. These latter adjustments are on both ends of the shaft 81, but only one end adjustment is illustrated in Fig. 8 of the drawing.

At the side of the machine, including the various drives, note Fig. 6, is a longitudinal shaft 109 arranged in suitable bearings, a helical gear 110 being arranged on the shaft 109, adjacent each of the printing units, the gear 110 meshing with a gear 100' on shaft 101. Other suitably supported gears, similar to the gear 100', will be provided at the other printing stations to mesh with other gears 110 on the shaft 109 at said stations.

Considering Fig. 7 of the drawing, it will appear that on the shaft 75 is a gear 114, which will mesh with a gear on the transfer roller 30, 30' for the drive of this roller, as well as the roller 29, 29'. Details of this drive are diagrammatically seen in Fig. 6 of the drawing, but are not shown in detail, as such drives are commonly known in the art. It will be understood that, when the supplemental frame 79 swings away from the main frame 78, the gears in question are not disengaged from each other, this movement being a slight movement.

The plates 38, 39 may be said to define an open delivery platform for supporting the articles or records for pick up by the dog 43; whereas, the rails 41 provide a lowering delivery of the articles, or records, so as to feed the same gradually upon the pins 45 as the supporting members 35 are fed to and through the respective printing stations.

It will also be apparent that, as the supporting members 35 approach the ejector station having the upwardly and downwardly inclined ejector 16, the article or record is moved over the upwardly inclined portion and downwardly upon the downwardly inclined portion by the dogs 43. This operation takes place as each member 35 and dog 43 make the turn around the sprocket 17. In this connection, it will be apparent that, as the record moves upwardly, on the upwardly inclined surface, the record clears the pin 45 and the adjacent dog 43 is sufficiently high to advance the record onto the downwardly inclined portion of the ejector 16, so as to be deposited upon the belt 15. The ejector 16 is of openwork construction and clears the member 35 and this ejector feed is sufficient to advance the article or record for delivery on the belt conveyor 15.

It will be understood that, as the article or record 42 is fed beneath each of the printing stations, the pressure ring 72' of the saddle 72 bears upon the article slightly for firm support of the article in the printing operation. As previously stated, the type or impression of the printing plate 73 protrudes slightly below the surface of the pressure ring 72'.

In the operation of the machine and after the printing plate, or plates, have been mounted on the respective cylinders and properly alined thereon and the various adjustments made for inking and position of the printing plate with respect to the article fed through the machine by the supporting members of the conveyor and synchronization of drive between the conveyor and the cylinders checked through the adjustments provided, the machine is now ready for operation.

At the beginning of the operation, the various ink pumps will be put into operation for supply of the required color and character of ink to the various ink reservoirs; whereupon, the machine is started and articles, such for example as the records, are then delivered one at a time onto the successive supporting members 35 of the conveyor in the manner heretofore clearly set forth; whereupon, the articles or records are then moved by the members beneath successive printing stations to receive the imprints of different colors at said stations and, after passing the last printing station such, for example, as the station 12', as illustrated in the drawing, the articles or records are then fed onto and moved over the ejector 16 and delivered upon the conveyor belt of the discharge station. It is pointed out, at this time, that spacing between the respective printing stations can be arranged to provide drying of the quick drying ink which is employed. However, in some instances, means can be employed between these stations and beyond the last station 12' for expediting the drying or setting operation.

As such drying means are commonly employed in other types and kinds of machine, no specific showing thereof is deemed to be necessary.

Having fully described my invention, what I claim as new and desire to secure by Letters Patent is:

1. In printing machines of the class described, employing an endless conveyor having a plurality of article supporting members spaced thereon for movement of articles with respect to a series of printing stations, a delivery station for delivering articles onto the members of said conveyor, said station having means for supporting a group of articles, means comprising a reciprocating feed plate for picking up articles one at a time from the group for delivery onto a pair of bevelled rails, article engaging means on the conveyor adjacent each member, operatively engaging the article supported on said rails to advance the article over said rails, in gradually lowering the article onto a supporting member, cooperating means, on the member and article, for definitely positioning the article on said member, and said last named means operating to advance the article on the member for disengagement from said article engaging means.

2. In printing machines of the class described, employing an endless conveyor having a plurality of article supporting members spaced thereon for movement of articles with respect to a series of printing stations, a delivery station for delivering articles onto the members of said conveyor, said station having means for supporting a group of articles, means comprising a reciprocating feed plate for picking up articles one at a time from the group for delivery onto a pair of bevelled rails, article engaging means on the conveyor adjacent each member, operatively engaging the article supported on said rails to advance the article over said rails, in gradually lowering the article onto a supporting member, cooperating means, on the member and article, for definitely positioning the article on said member, said last named means operating to advance the article on the member for disengagement from said article engaging means, said article supporting member including means yieldably supporting the article thereon, and said cooperating means comprising a pin on said member and an aperture in said article.

3. In printing machines of the class described, employing an endless conveyor having a plurality of article supporting members spaced thereon for movement of articles with respect to a series of printing stations, a delivery station for delivering articles onto the members of said conveyor, said station having means for supporting a group of articles, means comprising a reciprocating feed plate for picking up articles one at a time from the group for delivery onto a pair of bevelled rails, article engaging means on the conveyor adjacent each member, operatively engaging the article supported on said rails to advance the article over said rails, in gradually lowering the article onto a supporting member, cooperating means, on the member and article, for definitely positioning the article on said member, said last named means operating to advance the article on the member for disengagement from said article engaging means, said reciprocating feed plate having, at the edge thereof, a contour substantially conforming to part of the contour of the article engaged thereby, and the upper surface of said edge portion of the plate being bevelled.

4. In printing machines of the class described, employing an endless conveyor having a plurality of article supporting members spaced thereon for movement of articles with respect to a series of printing stations, a delivery station for delivering articles onto the members of said conveyor, said station having means for supporting a group of articles, means comprising a reciprocating feed plate for picking up articles one at a time from the group for delivery onto a pair of bevelled rails, article engaging means on the conveyor adjacent each member, operatively engaging the article supported on said rails to advance the article over said rails, in gradually lowering the article onto a supporting member, cooperating means, on the member and article, for definitely positioning the article on said member, said last named means operating to advance the article on the member for disengagement from said article engaging means, said reciprocating feed plate having, at the edge thereof, a contour substantially conforming to part of the contour of the article engaged thereby, the upper surface of said edge portion of the plate being bevelled, the articles delivered to said members comprising record discs, and means comprising a plurality of angularly arranged rods for angularly supporting a stack of the discs in position to be engaged by said feed plate.

5. In printing machines of the class described, employing an endless conveyor, having a plurality of article supporting members spaced thereon for movement of articles with respect to a series of printing stations, a delivery station for delivering articles onto the members of said conveyor, said station having means for supporting a group of articles, each of said members having article engaging and locating means, means on the conveyor for engaging an article for delivery onto one of said members, means, at said delivery station, for gradually lowering the delivered article onto the article engaging and locating means of said member, and means engaging said member for alining the same with the printing stations in movement of the member by said conveyor through said printing stations.

6. In a machine of the class described, comprising an article delivery station, a plurality of printing stations, an article ejector station and a discharge station, and endless conveyor extending between the delivery and ejector stations arranged beneath the printing stations and driven in synchronism with operation of the delivery and printing stations, article supporting members fixed along said conveyor at predetermined spaced intervals, means at the delivery station for supporting a group of articles, means for moving articles one at a time from said group onto said supporting members in movement of the conveyor through said delivery station, said article moving means including dogs adjacent said supporting members, and means at said delivery station for gradually lowering articles, advanced by said dogs, onto said members and with respect to means definitely positioning the articles on said members.

7. In a machine of the class described, comprising an article delivery station, a plurality of printing stations, an article ejector station and a discharge station, an endless conveyor extending between the delivery and ejector stations arranged beneath the printing stations and driven in synchronism with operation of the delivery and printing stations, article supporting members fixed along said conveyor at predetermined spaced intervals, means at the delivery station for supporting a group of articles, means for moving articles one at a time from said group onto said supporting members in movement of the conveyor through said delivery station, said article moving means including dogs adjacent said supporting members, means at said delivery station for gradually lowering articles, advanced by said dogs, onto said members and with respect to means definitely positioning the articles on said members, and means, including adjustable helical gears, controlling synchronized operation of the printing stations with respect to feed of the article by said conveyor.

8. In a machine of the class described, comprising an article delivery station, a plurality of printing stations, an article ejector station and a discharge station, an endless conveyor extending between the delivery and ejector stations arranged beneath the printing stations and driven in synchronism with operation of the delivery and printing stations, article supporting members fixed along said conveyor at predetermined spaced intervals, means at the delivery station for supporting a group of articles, means for moving articles one at a time from said group onto said supporting members in movement of the conveyor through said delivery station, said article moving means including dogs adjacent said supporting members, means at said delivery station for gradually lowering articles, advanced by said dogs, onto said members and with respect to means definitely positioning the articles on said members, and the article positioning means of said members operatively engaging the articles in movement of the articles on said members and away from said dogs.

9. In a machine of the class described, comprising an article delivery station, a plurality of printing stations, an article ejector station and a discharge station, an endless conveyor extending between the delivery and ejector stations arranged beneath the printing stations and driven in synchronism with operation of the delivery and printing stations, article supporting members fixed along said conveyor at predetermined spaced intervals, means at the delivery station for supporting a group of articles, means for moving articles one at a time from said group onto said supporting members in movement of the conveyor through said delivery station, said article moving means including dogs adjacent said supporting members, means at said delivery station for gradually lowering articles advanced by said dogs, onto said members and with respect to means definitely positioning the articles on said members, and adjustable means in the drive of said conveyor for synchronizing the speed of operation of the printing means at each station with the speed of travel of the article on said conveyor.

References Cited in the file of this patent

UNITED STATES PATENTS

| | | |
|---|---|---|
| 602,277 | Swift | Apr. 12, 1898 |
| 621,893 | Boulard | Mar. 28, 1899 |
| 1,123,055 | Wood | Dec. 29, 1914 |
| 1,758,536 | Post | May 13, 1930 |
| 1,949,688 | Kranz | Mar. 6, 1934 |
| 2,019,375 | Wheelwright | Oct. 29, 1935 |
| 2,169,676 | Buck et al. | Aug. 15, 1939 |
| 2,210,500 | Rohland | Aug. 6, 1940 |
| 2,253,027 | Hall | Aug. 19, 1941 |
| 2,603,341 | Knee | July 15, 1952 |
| 2,632,681 | Newcomer | Mar. 24, 1953 |
| 2,660,115 | Ras | Nov. 24, 1953 |
| 2,704,027 | Neklutin | Mar. 15, 1955 |
| 2,726,013 | Rice et al. | Dec. 6, 1955 |